(12) United States Patent
Yoshikawa et al.

(10) Patent No.: US 8,169,708 B2
(45) Date of Patent: *May 1, 2012

(54) PROJECTING OPTICAL UNIT AND PROJECTING TYPE IMAGE DISPLAY APPARATUS THEREWITH

(75) Inventors: Hiroki Yoshikawa, Hiratsuka (JP); Takanori Hisada, Yokohama (JP); Tetsu Ohishi, Hiratsuka (JP); Koji Hirata, Yokohama (JP); Naoyuki Ogura, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,784

(22) Filed: May 3, 2011

(65) Prior Publication Data
US 2011/0205499 A1 Aug. 25, 2011

Related U.S. Application Data

(63) Continuation of application No. 12/536,163, filed on Aug. 5, 2009, now Pat. No. 7,961,400, which is a continuation of application No. 11/280,821, filed on Nov. 17, 2005, now Pat. No. 7,586,687.

(30) Foreign Application Priority Data

Apr. 8, 2005 (JP) ................................. 2005-111516

(51) Int. Cl.
G02B 9/00 (2006.01)
G02B 17/00 (2006.01)

(52) U.S. Cl. ........................................ 359/649; 359/726

(58) Field of Classification Search .......... 359/649–651, 359/668
See application file for complete search history.

(56) References Cited

U.S. PATENT DOCUMENTS
5,274,408 A 12/1993 Fujisawa et al.
6,188,523 B1 2/2001 Choi
(Continued)

FOREIGN PATENT DOCUMENTS
JP 5-134213 5/1993
(Continued)

OTHER PUBLICATIONS

Chinese Office Action with English translation, issued in Chinese Patent Application No. 200510127941.2, dated on Mar. 30, 2007.

(Continued)

Primary Examiner — Jordan Schwartz
(74) Attorney, Agent, or Firm — McDermott Will & Emery LLP

(57) ABSTRACT

A projection image display device is disclosed in which a trapezoidal distortion and/or aberration are restrained when an image is enlarged and projected obliquely onto a screen. An image generator is connected to an optical system base in such a manner that at least an inclination thereof (on an axis parallel to X axis) with respect to a vertical line and a distance thereof in forward and backward direction (Z axis direction) can be adjusted by an adjusting mechanism. Further, a projecting lens 2 as a first optical system and a free-form curved surface mirror as a second optical system are fixed to the optical system base. The free-form curved surface mirror is rotatable (on an rotary axis parallel to X axis) with respect to the vertical line at a substantial center of the free-form curved surface mirror.

3 Claims, 10 Drawing Sheets

U.S. PATENT DOCUMENTS

| | | |
|---|---|---|
| 6,201,647 B1 | 3/2001 | Ohzawa |
| 6,690,517 B2 * | 2/2004 | Ohzawa et al. ............... 359/649 |
| 7,467,872 B2 | 12/2008 | Hisada et al. |
| 7,586,687 B2 | 9/2009 | Yoshikawa et al. |
| 7,961,400 B2 * | 6/2011 | Yoshikawa et al. ........... 359/649 |
| 2003/0058410 A1 * | 3/2003 | Ito ................................... 353/31 |
| 2004/0141157 A1 | 7/2004 | Ramachandran et al. |
| 2004/0156117 A1 | 8/2004 | Takaura et al. |
| 2004/0174611 A1 | 9/2004 | Hatakeyama |
| 2004/0196568 A1 | 10/2004 | Matsuo |
| 2005/0200974 A1 | 9/2005 | Nishikawa et al. |
| 2006/0056037 A1 | 3/2006 | Kuwa |
| 2006/0176579 A1 | 8/2006 | Kuwa |
| 2006/0227299 A1 | 10/2006 | Hisada et al. |
| 2008/0130106 A1 | 6/2008 | Gohman |
| 2009/0059180 A1 * | 3/2009 | Fuse et al. ....................... 353/58 |

FOREIGN PATENT DOCUMENTS

| | | |
|---|---|---|
| JP | 2000-162544 | 6/2000 |
| JP | 2001-264627 | 9/2001 |
| JP | 2002-350774 | 12/2002 |
| JP | 2002-357768 | 12/2002 |
| WO | WO 2004/111699 A1 | 12/2004 |

OTHER PUBLICATIONS

Entire Prosecution of U.S. Appl. No. 12/536,163 filed on Aug. 5, 2009 to Yoshikawa, et al., entitled "Projecting Optical Unit and Projecting Type Image Display Apparatus Therewith."

Entire Prosecution of U.S. Appl. No. 11/280,821 filed on Nov. 17, 2007 to Yoshikawa, et al., entitled "Projecting Optical Unit and Projecting Type Image Display Apparatus Therewith."

* cited by examiner

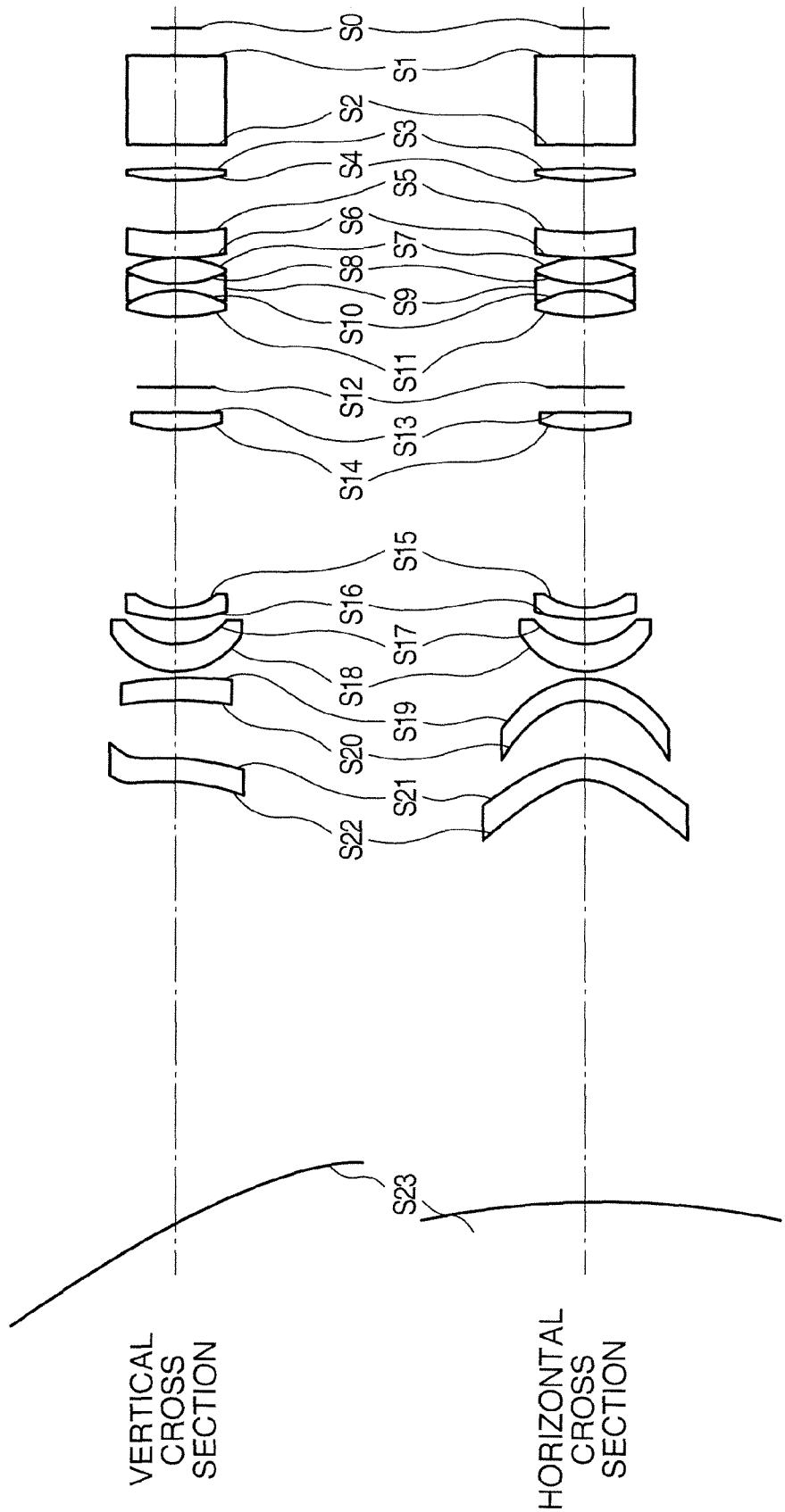

PROJECTING OPTICAL UNIT AND PROJECTING TYPE IMAGE DISPLAY APPARATUS THEREWITH

INCORPORATION BY REFERENCE

This application is a Continuation of U.S. application Ser. No. 12/536,163, filed on Aug. 5, 2009, now U.S. Pat. No. 7,961,400, which is a Continuation of U.S. application Ser. No. 11/280,821, filed Nov. 17, 2005, now U.S. Pat. No. 7,586,687, claiming priority of Japanese application JP 2005-111516 filed on Apr. 8, 2005, the contents of which is hereby incorporated by reference into this application.

BACKGROUND OF THE INVENTION

The present invention relates to a projecting type image display apparatus for projecting an enlarged multicolor image onto a screen, particularly, a projecting type image display apparatus in which the image is projected obliquely to the screen so that the enlarged image is formed on the screen, and a projecting optical unit usable for the device.

In a projecting type image display apparatus for projecting onto a screen an image formed by a display element including a reflection or transmission type liquid crystal panel or micro-mirrors while being enlarged, a sufficiently enlarged image on the screen as well as a reduction of depth length are required. For these requirements, a projecting optical unit for projecting the image obliquely to the screen (hereafter, called as oblique projection) while enlarging it as disclosed by JP-A-2001-264627, is known. Further, an optical adjustment for a case in which a curved mirror is used for the oblique projection, is disclosed by JP-A-2002-350774.

BRIEF SUMMARY OF THE INVENTION

In the oblique projection in which the image is projected (for example, from a lower area of the screen) with a predetermined angle with respect to a normal line of a main screen plane, the image projected on the screen includes a trapezoidal distortion and aberration caused by a difference in projecting length between upper and lower portions of the screen. For solving these, in the above mentioned JP-A-2001-264627, the trapezoidal distortion is compensated by a free-form curved mirror arranged between a projecting optical system and the screen and having a negative power. On the other hand, the aberration is compensated by that an image forming element is moved parallel with respect to a coaxial projecting optical system or the image forming element is inclined with respect to the coaxial projecting optical system while being moved parallel with respect to the coaxial projecting optical system.

However, by this compensation of the aberration, there is a provability of that the image is shifted vertically on the screen, so that a compensating mechanism therefore is required. Further, when using the coaxial projecting optical system, an angle of projecting field needs to be significantly great so that a number of lenses and an aperture thereof are increased.

In the above mentioned JP-A-2002-350774, an adjusting method using the movement of the free-form curved mirror is disclosed, but the compensation of the aberration is not considered.

As mentioned above, since the trapezoidal distortion and the aberration are compensated by respective means in the prior art, the diameters and number of the lenses need to be great. Therefore, in the above mentioned prior art, decreasing in the oblique projection the depth length and/or a height of a lower portion of the screen while reducing sufficiently the trapezoidal distortion and aberration (hereafter, called as a set-compacting) is difficult.

The present invention is for solving the above mentioned problems, and an object thereof is to provide a technique preferable for the set-compacting with displaying the image of the reduced trapezoidal distortion and aberration.

Further, the present invention provides a technique making a production or assembling adjustment of the compacted set with the above mentioned displaying characteristics easy in a rear projection type image display device.

The present invention for the oblique projection is characterized in that a first optical system having projecting lenses including at least one asymmetry lens of rotationally asymmetry shape with respect to an optical axis and of concave light transit surface and a second optical system having a convex mirror having a reflection surface at least a part of which is a convex light reflection surface are fixedly mounted on a common optical system supporting unit.

The asymmetry lens is a free-form curved surface in which a curvature of a part through which a light beam toward a lower end of a screen passes is greater than a curvature of a part through which a light beam toward an upper end of the screen passes. Further, on the convex mirror, a curvature of a part by which a light beam toward a lower area of the screen is reflected is greater than a curvature of a part by which a light beam toward an upper area of the screen is reflected, or alternatively, the part by which the light beam toward the lower area of the screen is reflected has a convex shape while the part by which the light beam toward the upper area of the screen is reflected has a concave shape.

Further, at least one of a mechanism for at least one of an angular adjustment between the optical axis of the projecting lens and a direction in which the light beam is emitted from an image generator including an image display element and an adjustment of optical distance between the image generator and the projecting lens, a mechanism for rotational adjustment of the free-form curved mirror on an axis at a substantially center position of the free-form curved mirror and a mechanism for a positional adjustment of a lens group of the greatest positive power in the projecting lens along the optical axis of the projecting lens, is included by the present invention.

By the above mentioned structure of the present invention, an image in which the trapezoidal distortion and/or aberration caused by the oblique projection of the image is reduced is obtainable, and the set-compacting is performed.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 10 is a cross sectional view of the projecting optical unit of the invention.

DETAILED DESCRIPTION OF THE INVENTION

Hereafter, an embodiment of the invention will be explained with making reference to the drawings.

Figure 1:
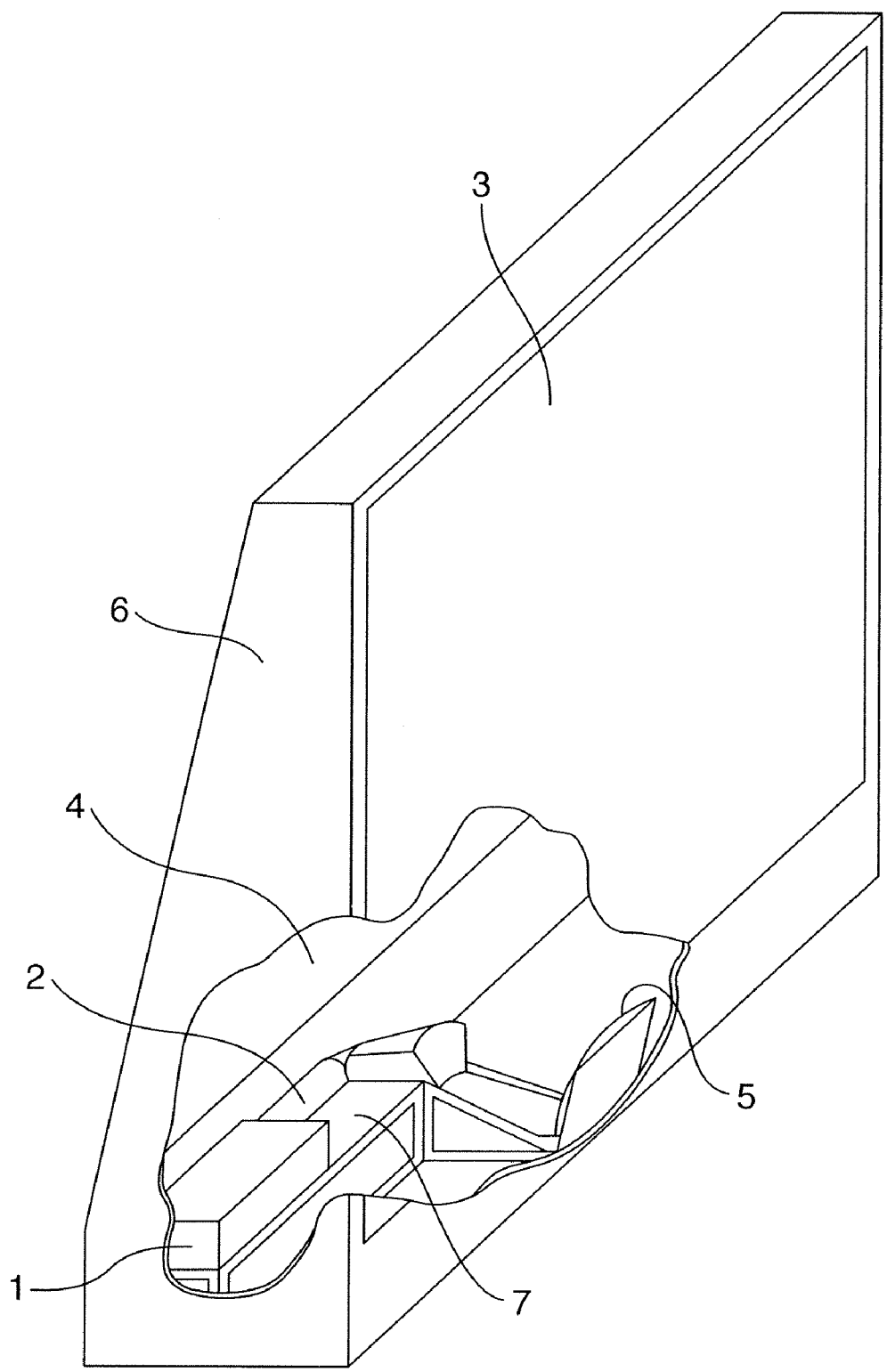
FIG. 1 is a cross sectional view showing an embodiment of an image display device of the invention.

FIG. 1 is an oblique projection partially cross sectional view of an image display device of the invention. An image generator 1 displays an image of small size. The image generator 1 includes a reflection or transmission type liquid crystal panel or an optical modulating element such as a display element including micro-mirrors. Further, the image generator 1 may include a projection type braun tube. An image of the image generator 1 is projected onto a screen 3 through a projecting lens 2 as a component of a first optical system. A planar reflection mirror 4 is arranged on an optical path from the projecting lens 2 to the screen 3 to decrease a depth length of the image display device. A free-form curved mirror 5 as a component of a second optical system is arranged between the projecting lens 2 and the planar reflection mirror 4. A light from the projecting lens is reflected by the free-form curved mirror 5 to be guided onto the planar reflection mirror 4, and reflected by the planar reflection mirror 4 to be guided onto the screen 3. These members are contained by an inside of a frame 6 and fixed to respective predetermined positions. Further, the image generator 1, projecting lens 2 and free-form curved mirror 5 are fixed to an optical system base 7. Hereafter, a distinctive feature of the components of the projecting optical unit of the invention will be explained with making reference to the drawings.

Figure 2:
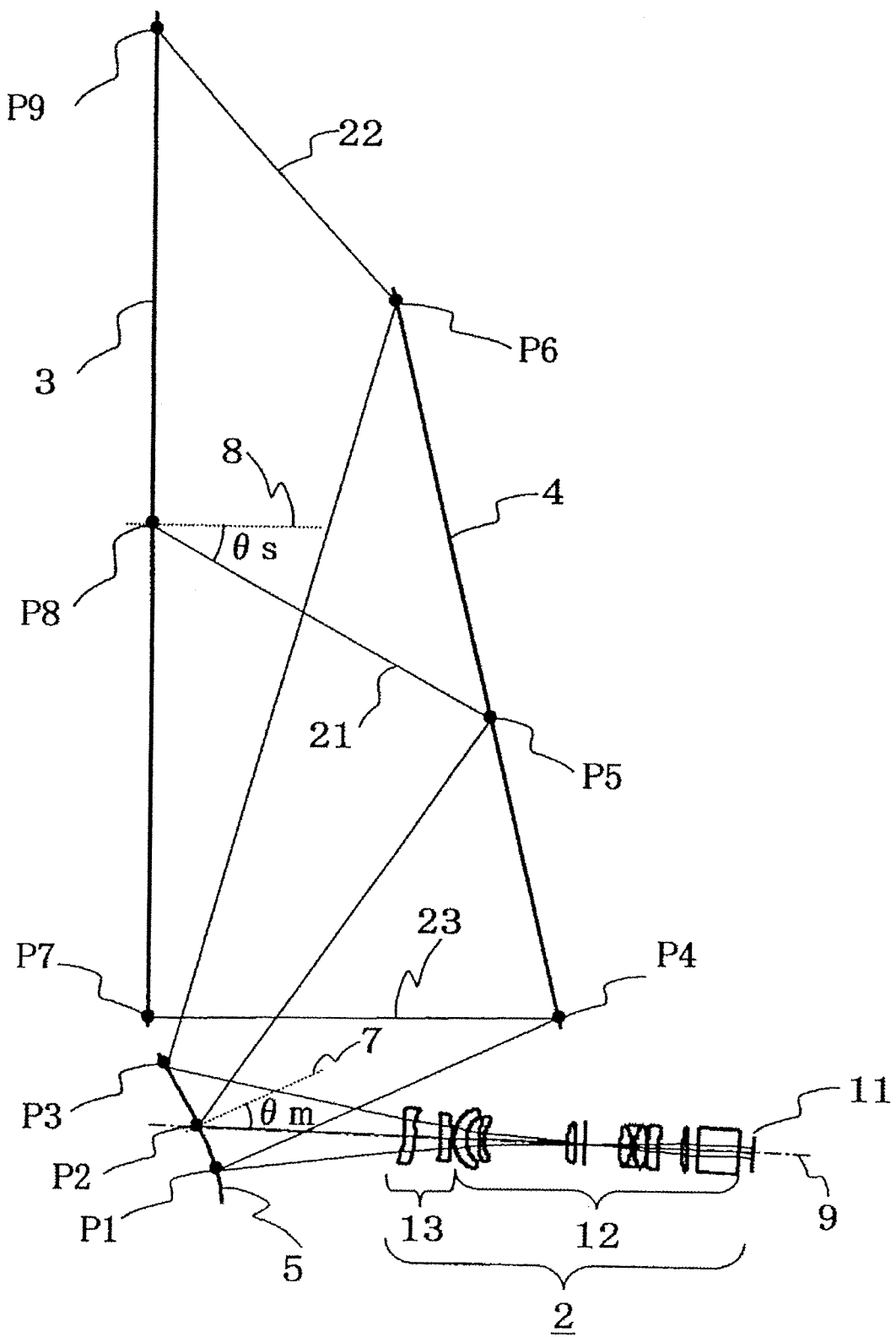
FIG. 2 is a cross sectional view showing a basis structure of a projecting optical unit of the invention.

FIG. 2 is a cross sectional view showing a basic optical structure of a rear projection type image display device in which the projection optical unit of the embodiment is used. FIG. 2 shows the structure of the optical system on a Y-Z cross section in XYS orthogonal coordinates system. Here, an origin point of the XYS orthogonal coordinates system is at a center of an image display surface of an image display element 11 of the image generator 1, and Z coordinate axis is parallel to a normal line of the screen 3. Y coordinate axis is parallel to a short side edge of the screen and a horizontal direction of the screen. X coordinate axis is parallel to a long side edge of the screen and a vertical direction of the screen.

As shown in FIG. 2, the light emitted from the image display element 11 passes through a front group 12 of dioptric lenses having respective rotationally symmetrical surfaces shapes in the projecting lens 2 as the transmission type lens group, and thereafter passes through a rear group 13 including a lens (hereafter, called as a free-form curved surface lens) in the projecting lens, at least one surface (at least one of side surfaces of the lens opposite to each other in a direction parallel to the light) of which lens has a rotationally asymmetrical free-form curved surface shape. Thereafter, the light is reflected by at least one reflection mirror (hereafter, called as a free-form curved surface mirror) having a rotationally asymmetrical free-form curved reflecting surface, subsequently reflected by the planar reflection mirror 4, and finally reaches the screen 3.

When the image display element 11 is the optical modulating element, an illuminating system such as a lamp or the like for illuminating the optical modulating element is needed, however, such system is not shown in the drawings. Further, the image display element 11 may be a type such as a so-called three-plates type in which a plurality of the images are combined. A combining optical system such as a prism for such combination is also not shown in the drawings.

Since a length of the projecting lens 2 is long in FIG. 2, a distance between the image display element 11 and the screen in a direction of the normal line of the screen seems to be great so that the depth is increased. However, in the embodiment, a mirror (not shown) is arranged between the free-form curved surface mirror 5 and the rear group 13 of the projecting lens 2, between the front and rear groups 12 and 13 of the projecting lens 2 or in an intermediate position in the front group 12. Therefore, the optical axis of the projecting lens 2 is bent to a direction perpendicular to the cross section of FIG. 2 so that the increase of the depth is prevented.

In the embodiment, as shown in FIG. 2, the image display element 11 is arranged in such a manner that a center of the display surface is arranged on the optical axis of the projecting lens 2. Therefore, the light beam 21 emitted from the center of the display surface of the image display element 11 and passing through a center of entrance pupil of the projecting lens toward a center of an image plane on the screen 21 proceeds substantially along the optical axis of the projecting lens 2 (hereafter, called as an image center light beam). After being reflected at a point P2 on the reflecting surface of the free-form curved surface mirror 5, the image center light beam is reflected at a point P5 on the planar reflection mirror 4, and reaches a point P8 at a center of the image plane on the screen 3 with a predetermined angle with respect to (that is, obliquely to) the normal line 8 of the screen. This angle is called hereafter as an oblique incident angle θs.

In other words, the light beam proceeding along the optical axis of the projecting lens 2 reaches the screen obliquely to the screen, so that substantially the optical axis of the projecting lens 2 is oblique to the screen. By the oblique incidence onto the screen in this method, so-called trapezoidal distortion as change in projection from rectangular shape to trapezoidal shape as well as various aberrations asymmetrical with respect to the optical axis occur. In this embodiment, these are corrected by the rear group 13 of the projecting lens 2 and the reflecting surface of the second optical system.

In the cross section shown in FIG. 2, a light beam 22 is emitted from a lower end of the image plane of the image display element 11 and proceeds through the center of the entrance pupil of the projecting lens 2 to the corresponding point P9 at an upper end of the image plane on the screen. Further, a light beam 23 is emitted from an upper end of the image plane of the image display element 11 and proceeds through the center of the entrance pupil of the projecting lens 2 to the corresponding point P7 at a lower end of the image plane on the screen. As shown in FIG. 2, an optical path length from the point P3 through the point P6 to the point P9 is longer than an optical path length from the point P1 through the point P4 to the point P7. This means that as seen from the projecting lens 2 toward the screen, the image point P9 is farther than the image point P7. Therefore, an inclination of the image plane is corrected by that a distance between an object point (a point on the image plane) corresponding to the image point P9 on the screen and the projecting lens 2 is relatively decreased and a distance between an object point corresponding to the image point P7 and the projecting lens 2 is relatively increased. For this, a normal vector at the center of the image plane on the image display element 1 is inclined to the optical axis of the projecting lens 2. Concretely, the normal vector is inclined toward the screen in Y-Z plane. A method for inclining the object plane to obtain an image plane inclined to the optical axis is known. However, the image plane formed by inclining the object plane includes a distortion asymmetrical with respect to the optical axis in a practicable angle of field, so that it cannot be corrected by a projecting lens symmetrical rotationally. In this embodiment, since the free-form curved surface which is not rotationally symmetrical but is rotationally asymmetrical is used, the asymmetrical distortion of the image can be corrected. Therefore, the distortion in low dimension of the image plane can be reduced by inclining the object plane so that the correction of aberration is effectively assisted by the free-form curved surface.

Next, an influence of each optical element is explained. The front group 12 of the projecting lens 2 as the first optical system is a main lens for projecting onto the screen 3 the displayed image on the image display element 11, and corrects the basis aberration in the rotationally symmetrical optical system. The rear group 13 of the projecting lens 2 includes the free-form curved surface lens asymmetrical rotationally. In the embodiment, the free-form curved surface lens is curved to be concave in a light emitting direction. A curvature of a part of the free-form curved surface lens through which the light beam toward the lower end of the screen 3 is made greater than a curvature of a part of the free-form curved surface lens through which the light beam toward the upper end of the screen 3. The second optical system includes a free-form curved surface mirror having a free-form curved surface shape asymmetrical rotationally. In this embodiment, the free-form curved surface mirror is a convex surface mirror asymmetrical rotationally, a part of which is curved to be convex in a reflecting direction of the light. Concretely, a curvature of a part of the free-form curved surface mirror for reflecting the light toward the lower area of the screen is made greater than a curvature of a part thereof for reflecting the light toward the upper area of the screen. The part of the free-form curved surface mirror for reflecting the light toward the lower area of the screen may be convex in the reflecting direction of the light, and the part thereof for reflecting the light toward the upper area of the screen may be concave in the reflecting direction of the light. By the free-form curved surface mirror and the free-form curved surface lens, the aberration mainly caused by the oblique incidence is corrected. That is, the second optical system mainly corrects the trapezoidal distortion, and the rear group 13 of the projecting lens 2 as the first optical system mainly corrects the asymmetrical aberration such as the distortion of the image or the like.

As mentioned above, in the embodiment, the first optical system includes at least one free-form curved surface lens asymmetrical rotationally, and the second optical system includes at least one free-form curved surface mirror. Therefore, both of the trapezoidal distortion and the aberration caused by the oblique projection can be corrected.

It is preferable for a distance along the optical axis between the origin point of the coordinate system of the reflection surface of the second optical system (here, a position at which the central light beam of the image is reflected) and a surface of one of the lenses of the front group 12 of the projecting lens closest to the screen to be not less than 5 times of a focal distance of the front group of the projecting lens. Therefore, the trapezoidal distortion and the aberration can be effectively corrected by the reflecting surface of the second optical system to obtain an improved performance.

On the other hand, since the greater a size of the free-form curved surface mirror is, the more difficult a production thereof becomes, it is important for the free-form curved surface mirror to be not greater than a predetermined size. For example, since a size of the planar surface reflection mirror 4 as shown in FIG. 2 is about not less than 70% of the image plane on the screen, its size for a great display rear projector of not less than 50 inches becomes more than 500 mm, so that a production thereof with the free-form curved surface shape becomes very difficult. Therefore, it is not preferable that the planer surface reflection mirror for the rear projector is replaced by the free-form curved surface mirror. Accordingly, in the embodiment, a size of the free-form curved surface mirror 5 is made smaller than a size of the planer surface reflection mirror 3, and the free-form reflection mirror 5 is arranged below the planer surface reflection mirror 3. The image light from the projecting lens 2 is reflected by the free-form curved surface mirror 5 and subsequently by the planer surface reflection mirror to be projected onto the screen 3.

The above explanation is based on the embodiment shown in FIG. 2. However, the concept of the above mentioned embodiment is applicable to a case in which a bending direction of the optical path by the mirror is arranged by a plane including the longer side of the image plane contrary to FIG. 2.

Accordingly, in the projecting lens 2 including a refracting surface, the trapezoidal distortion caused by the oblique projection can be corrected without an increase of the number of the lenses. Further, the projection optical unit of the small depth can be produced easily. Further, in the embodiment, a compact set of the reduced depth and height under the screen can be provided, and the production of the optical system can be made easy by the small free-form curved surface mirror.

Hereafter, the embodiment of the optical system of the invention will be explained with indicating concrete numerical values as example. One numerical example is explained with using fogs. 3-6 and tables 1-4.

Figure 3:
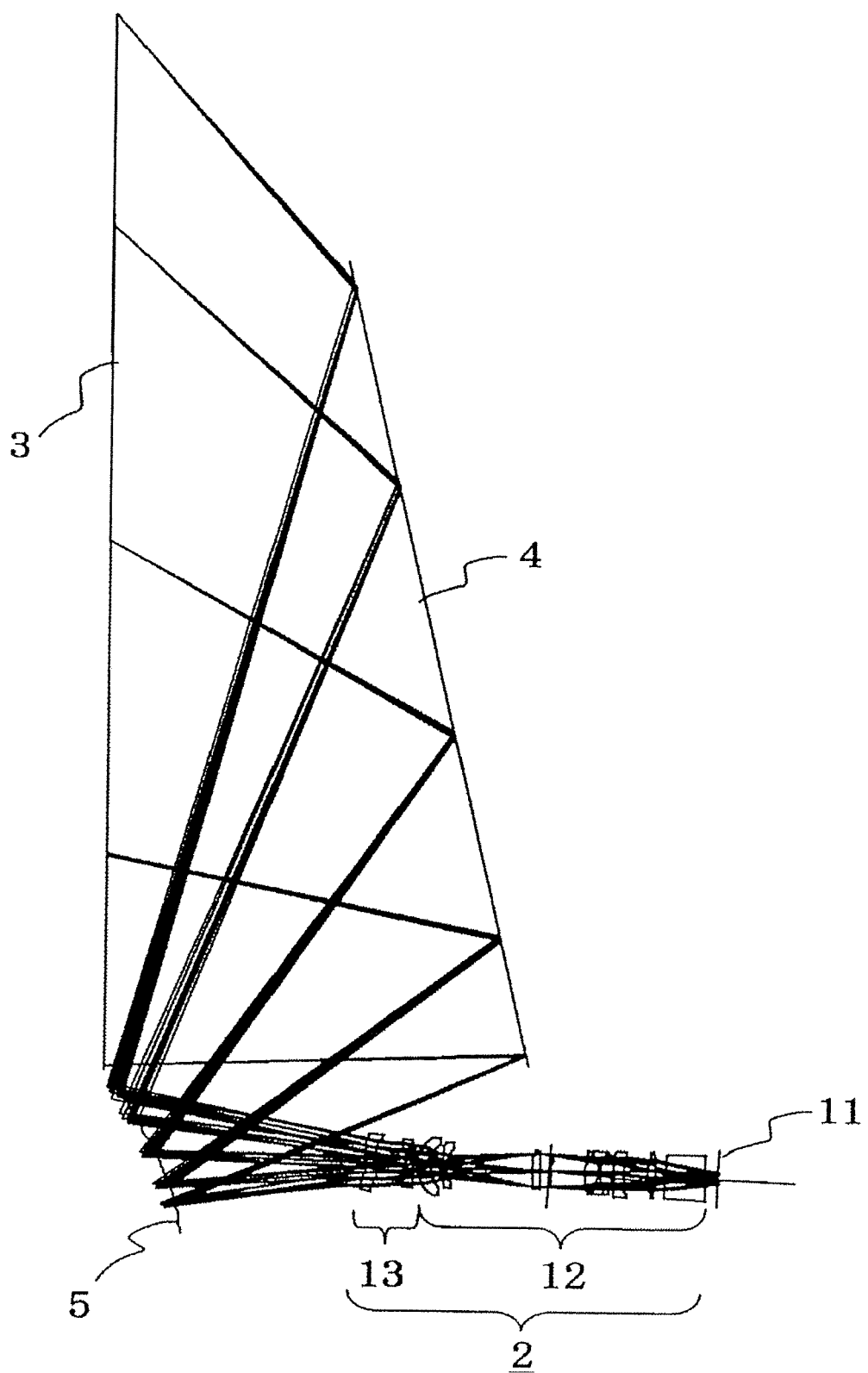
FIG. 3 is an Y-Z cross sectional view showing the structure and optical path of the embodiment of the invention.
Figure 4:
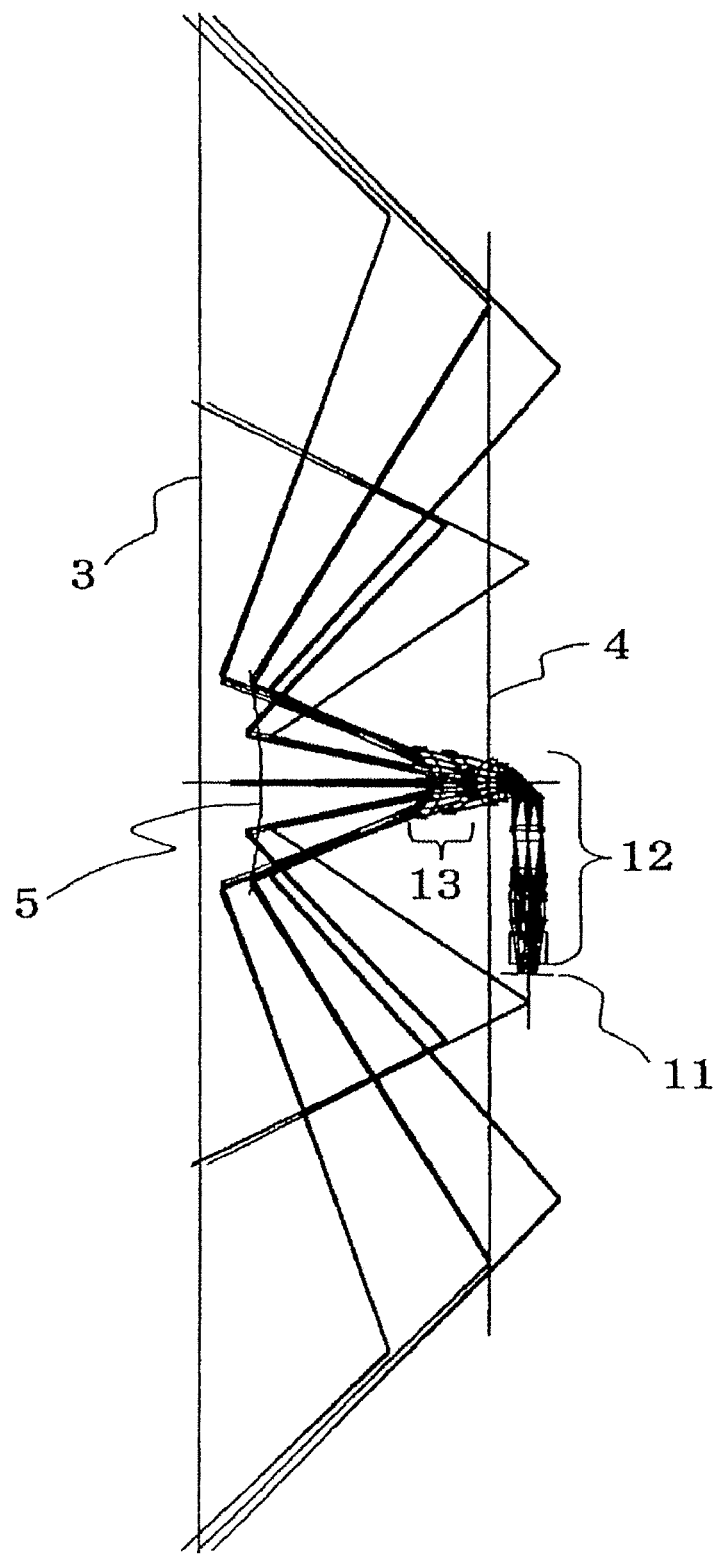
FIG. 4 is an X-Z cross sectional view showing the structure and optical path of the embodiment of the invention.

FIGS. 3 and 4 are views showing the light beams based on a first numerical example. In the above mentioned XYZ orthogonal coordinate system, FIG. 3 shows a structure on YZ cross section, and FIG. 4 shows a structure on XZ cross section. In FIG. 1, an example in which a bending mirror is arranged at the intermediate position of the front group 12 of the projecting lens 2 to bend the optical path by one time to the X axis direction. In FIG. 3, this bending mirror is eliminated, and the optical system is expanded to the Z axis direction. FIG. 4 shows the optical system with the bending mirror in a bent condition. The bending mirror has a tolerance in its arranged position and angle, and no effect for performance of each optical element. Therefore, an explanation of the bending mirror is eliminated in the below explanation.

In this embodiment, the light emitted from the image display element 11 shown in a lower side of FIG. 3 passes at first through the front group 12 composed of the lenses having the rotationally symmetrical surfaces in the projecting lens 2. Subsequently, it passes through the rear group 13 including the free-form curved surface lens asymmetrical rotationally to be reflected by the reflecting surface of the free-form curved surface mirror 5 as the second optical system. The reflected light proceeds onto the screen 3 after being reflected by the planar surface reflecting mirror 4.

The front group 12 of the projecting lens 2 is composed of the plurality of lenses having respective refracting surfaces symmetrical rotationally, four ones of the refracting surfaces are aspherical and rotationally symmetrical, and the remainder ones thereof are spherical. The aspherical and rotationally symmetrical surfaces are represented by the following formula in a local cylindrical coordinate system for each surface.

$$Z = \frac{cr^2}{1+\sqrt{1-(1+k)c^2r^2}} + A\cdot r^4 + B\cdot r^6 + C\cdot r^8 +$$
$$D\cdot r^{10} + E\cdot r^{12} + F\cdot r^{14} + G\cdot r^{16} + H\cdot r^{18} + J\cdot r^{20}$$
[formula 1]

A distance from the optical axis is r, and a sag amount is Z. Further, a curvature at a peak is c, a conical constant is k, and coefficients of sections for power with respect to r are A-J.

The free-form curved surface lens in the rear group 13 of the projecting lens 2 is represented by the following formula including polynomial equations for X and Y in a local orthogonal coordinate system (x, y, z) whose origin point is a surface peak of each surface.

$$Z = \frac{cr^2}{1+\sqrt{1-(1+k)c^2r^2}} + \sum_m \cdot \sum_n (C(m,n)\cdot x^m \cdot y^n)$$
[formula 2]

A sag amount of the free-form curved surface in a direction perpendicular to X and Y axes is Z, a curvature at the peak is c, a distance from the origin point in the plane of X and Y axes is r, a conical constant is k, and a coefficient for polynomial equation is C(m, n).

Table 1 shows numerical data of the optical system of the embodiment. In table 1, S0-S23 correspond to reference codes S0-S23 in FIG. 10. S0 denotes the display surface of the image display element 11, that is, the object face, and S23 denotes the reflecting surface of the free-form curved surface mirror 5. S24 not shown in FIG. 10 denotes the incidence surface of the screen 3, that is, the image face. Incidentally, in FIG. 10, an upper part thereof is a vertically cross sectional view of the first and second optical systems, and a lower part thereof is a horizontally cross sectional view thereof.

In table 1, a curvature radius of each surface is Rd, and has a positive value when a center of the curvature is at a left side of the surface in FIG. 3 and a negative value when being opposite side. In table 1, TH is a distance between the surfaces, that is, a distance from the peak of the surface of one of the lenses to the peak of the surface of the adjacent other one of the lenses. The distance of the one of the lenses between the surfaces has a positive value when the surface of the adjacent other one of the lenses is arranged at a left side in FIG. 3, and a negative value when being at a right side. Further, S5, S6, S17 and S18 in table 1 are aspherical and rotationally symmetrical, and have suffixes * attached to the surface denoting codes in table 1 to be easily recognized. Coefficients of these four aspherical surfaces are sown in table 2.

In table 1, S19-S22 are refraction surfaces of the free-form curved surface lens included by the rear group 13 of the projecting lens 2, and S23 is the reflecting surface of the free-form curved surface mirror 5 as mentioned above, while the denoting codes for the surfaces have suffixes #. Table 3 shows values of coefficients representing the shape of these five free-form curved surfaces.

In this embodiment, the object face as the image display of the image display element 11 is inclined with respect to the optica axis of the projecting lens 2 by −1.163 degree. A direction of the inclination has a positive value when a normal line of the object face is rotated anti-clockwise in the cross section of FIG. 3. Therefore, in the embodiment, the object face is rotated clockwise from a position perpendicular to the optical axis of the projecting lens by 1.163 degree in the cross section of FIG. 3.

The free-form curved surface mirror 5 as S23 has an origin point of its local coordinate on the optical axis of the projecting lens 2. A normal line at the origin point of the local coordinate of the free-form curved surface mirror 5, that is, the Z axis, is inclined from a position parallel to the optical axis of the projecting lens 2 by 29 degrees. The inclination has a positive value when being rotated anti-clockwise in the cross section of FIG. 3 similarly to the object face, that is, being inclined anti-clockwise. Accordingly, the image center light beam emitted from the center of the image on the image display element 11 and proceeding substantially along the optical axis of the projecting lens 2 is reflected by S23, and subsequently proceeds in a direction inclined with respect to the optical axis of the projecting lens by 58 degrees of two times of the inclining angle. New optical axis after being reflected is along a direction passing the origin point of the coordinate of S23 and inclined by two times of the inclining angle of S23 with respect to the optical axis of the projecting lens 2, and the following surfaces are arranged on this optical axis. The distance value of −400 between the surfaces of S23 on table 1 indicates that the following S24 is arranged at the right side of S23 and the origin point of the local coordinate of S24 is distant by 400 mm along the optical axis after being reflected. The following surfaces are arranged in the same order.

Table 4 indicates an inclination and eccentricity of the local coordinate of each surface of the embodiment. In FIG. 4, values of the inclining angle and eccentricity are shown at right sides of the surface numbers, ADE is an amount of the inclination in a face parallel to the cross section of FIG. 3, and the indicating order is as mentioned above. YDE is an amount of the eccentricity, the eccentricity is set in a direction perpendicular to the optical axis and in a plane parallel to the cross section of FIG. 3, and the eccentricity toward the lower side in the cross section of FIG. 3 has a positive value. Incidentally, YDE is 0 (that is, no eccentricity) in the embodiment.

According to the invention, the inclinations and eccentricities of all of the optical elements are set in the directions on the cross sections parallel to the cross sections of the drawings.

From tables 1 and 3, it is known that the curvature c and Korenich constant k are 0 in the embodiment. The trapezoidal distortion caused by the oblique projection increases significantly in the direction of the oblique projection, and a distortion amount in a direction perpendicular thereto is small. Therefore, the performance in the direction of the oblique projection and the performance in the direction perpendicular thereto need to be significantly different from each other, and the asymmetrical aberration is sufficiently corrected by preventing the curvature c and Korenich constant k rotationally symmetrical and effective for all directions from being used.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5 * | −83.708 | 9.00 | 1.49245 | 42.9 |
| S6 * | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |

TABLE 1-continued

| Surface | Rd | TH | nd | vd |
|---|---|---|---|---|
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17 * | −27.332 | 10.00 | 1.49245 | 42.9 |
| S18 * | −32.424 | 2.50 | | |
| S19 # | Infinity | 8.00 | 1.49245 | 42.9 |

TABLE 1-continued

| Surface | Rd | TH | nd | vd |
|---|---|---|---|---|
| S20 # | Infinity | 20.51 | | |
| S21 # | Infinity | 8.00 | 1.49245 | 42.9 |
| S22 # | Infinity | 160.99 | | |
| S23 # | Infinity | −400.00 | REFL | |
| S24 | Infinity | 305.00 | REFL | |
| S25 | Infinity | — | | |

TABLE 2

| Surface | | Aspheric surface coefficient | | | | | | |
|---|---|---|---|---|---|---|---|---|
| S5 | K | −11.7678542 | C | −1.159E−11 | F | 2.98642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.016429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

TABLE 3

| Surface | | | Free from surface coefficient | | | | | |
|---|---|---|---|---|---|---|---|---|
| S19 | | | C(4, 1) | 5.38933E−07 | C(2, 5) | −1.2381E−09 | C(4, 5) | −7.4126E−14 |
| | K | 0 | C(2, 3) | 8.33432E−07 | C(0, 7) | 1.13944E−09 | C(2, 7) | 2.05074E−12 |
| | C(2, 0) | 0.013500584 | C(0, 5) | −4.6367E−08 | C(8, 0) | 3.87771E−12 | C(0, 9) | −9.2166E−13 |
| | C(0, 2) | 0.003493312 | C(6, 0) | −6.2643E−09 | C(6, 2) | 1.04779E−11 | C(10, 0) | −2.5867E−15 |
| | C(2, 1) | −0.00083921 | C(4, 2) | −2.2449E−08 | C(4, 4) | 1.80038E−11 | C(8, 2) | −8.7122E−15 |
| | C(0, 3) | −0.00032098 | C(2, 4) | −5.6706E−08 | C(2, 6) | 5.23019E−11 | C(6, 4) | 2.85321E−14 |
| | C(4, 0) | 8.59459E−06 | C(0, 6) | 9.69952E−10 | C(0, 8) | 1.69253E−11 | C(4, 6) | −8.5084E−14 |
| | C(2, 2) | 2.14814E−06 | C(6, 1) | −1.1968E−10 | C(8, 1) | −2.7E−14 | C(2, 8) | 1.25198E−13 |
| | C(0, 4) | 7.54355E−06 | C(4, 3) | −1.3638E−09 | C(6, 3) | 7.30978E−13 | C(0, 10) | −5.6277E−14 |
| S20 | | | C(4, 1) | 7.49262E−07 | C(2, 5) | −5.7462E−10 | C(4, 5) | −3.6141E−13 |
| | K | 0 | C(2, 3) | 1.19039E−06 | C(0, 7) | 1.27396E−09 | C(2, 7) | 8.54188E−14 |
| | C(2, 0) | 0.015488689 | C(0, 5) | −1.2953E−07 | C(8, 0) | −4.7746E−12 | C(0, 9) | −5.3469E−13 |
| | C(0, 2) | 0.006553414 | C(6, 0) | 5.115E−10 | C(6, 2) | 7.32855E−12 | C(10, 0) | 8.92545E−17 |
| | C(2, 1) | −0.00116756 | C(4, 2) | −2.1936E−08 | C(4, 4) | 5.30157E−11 | C(8, 2) | −5.3434E−15 |
| | C(0, 3) | −0.00033579 | C(2, 4) | −5.9543E−08 | C(2, 6) | 5.05014E−11 | C(6, 4) | 1.96533E−14 |
| | C(4, 0) | 7.5015E−06 | C(0, 6) | 2.03972E−08 | C(0, 8) | −2.1894E−11 | C(4, 6) | −1.3923E−13 |
| | C(2, 2) | −2.5728E−06 | C(6, 1) | 1.16701E−11 | C(8, 1) | −1.2515E−13 | C(2, 8) | 1.06322E−13 |
| | C(0, 4) | −1.3543E−06 | C(4, 3) | −1.6198E−09 | C(6, 3) | 7.64489E−13 | C(0, 10) | −4.6602E−15 |
| S21 | | | C(4, 1) | −1.0379E−07 | C(2, 5) | 2.81743E−10 | C(4, 5) | −8.1775E−15 |
| | K | 0 | C(2, 3) | 3.0082E−08 | C(0, 7) | 6.05663E−10 | C(2, 7) | 3.06022E−14 |
| | C(2, 0) | 0.015096874 | C(0, 5) | 7.95521E−08 | C(8, 0) | 8.39381E−13 | C(0, 9) | −9.1775E−13 |
| | C(0, 2) | 0.009982808 | C(6, 0) | −1.3911E−09 | C(6, 2) | 1.98531E−12 | C(10, 0) | −7.8543E−17 |
| | C(2, 1) | 0.000358347 | C(4, 2) | 9.33292E−10 | C(4, 4) | 1.37477E−11 | C(8, 2) | −8.9588E−16 |
| | C(0, 3) | 0.000209267 | C(2, 4) | 3.54468E−09 | C(2, 6) | −1.0671E−11 | C(6, 4) | −6.0768E−15 |
| | C(4, 0) | −3.8593E−07 | C(0, 6) | 4.1615E−09 | C(0, 8) | 9.04109E−12 | C(4, 6) | −1.9528E−14 |
| | C(2, 2) | −6.8336E−06 | C(6, 1) | −1.2331E−11 | C(8, 1) | 2.48401E−14 | C(2, 8) | 2.6781E−14 |
| | C(0, 4) | −2.2455E−05 | C(4, 3) | −2.3367E−10 | C(6, 3) | 6.92603E−14 | C(0, 10) | −1.4324E−14 |
| S22 | | | C(4, 1) | −3.6973E−07 | C(2, 5) | 4.8045E−10 | C(4, 5) | −2.9795E−13 |
| | K | 0 | C(2, 3) | −3.0682E−07 | C(0, 7) | 1.43328E−10 | C(2, 7) | −2.5306E−14 |
| | C(2, 0) | 0.022813527 | C(0, 5) | 4.12093E−08 | C(8, 0) | −2.0707E−12 | C(0, 9) | −3.9401E−13 |
| | C(0, 2) | 0.012060543 | C(6, 0) | 4.07969E−09 | C(6, 2) | −4.9221E−12 | C(10, 0) | 6.88651E−16 |
| | C(2, 1) | 0.000638931 | C(4, 2) | 8.5986E−09 | C(4, 4) | −2.3681E−12 | C(8, 2) | 1.55006E−15 |
| | C(0, 3) | 0.000196027 | C(2, 4) | 2.1713E−08 | C(2, 6) | −2.1567E−11 | C(6, 4) | −1.4674E−15 |
| | C(4, 0) | −7.1204E−06 | C(0, 6) | 1.63499E−08 | C(0, 8) | −2.3679E−12 | C(4, 6) | −9.9822E−15 |
| | C(2, 2) | −1.269E−05 | C(6, 1) | 1.38704E−10 | C(8, 1) | −5.7167E−15 | C(2, 8) | 2.72925E−14 |
| | C(0, 4) | −2.5184E−05 | C(4, 3) | 2.02372E−10 | C(6, 3) | −9.0337E−14 | C(0, 10) | −1.1966E−14 |
| | | | C(4, 1) | −1.1083E−09 | C(2, 5) | −4.9118E−14 | C(4, 5) | −5.4918E−19 |
| | K | 0 | C(2, 3) | −5.7768E−10 | C(0, 7) | 8.12546E−14 | C(2, 7) | −2.2569E−18 |

TABLE 3-continued

| Surface | | | Free from surface coefficient | | | | | |
|---|---|---|---|---|---|---|---|---|
| S23 | C(2, 0) | 0.001597194 | C(0, 5) | 1.60076E−10 | C(8, 0) | −7.486E−17 | C(0, 9) | −3.5657E−18 |
| | C(0, 2) | 0.001324181 | C(6, 0) | 1.91534E−12 | C(6, 2) | 6.80626E−16 | C(10, 0) | 1.09883E−21 |
| | C(2, 1) | 1.37885E−05 | C(4, 2) | −1.0665E−11 | C(4, 4) | −5.1295E−17 | C(8, 2) | −2.1535E−20 |
| | C(0, 3) | 1.34349E−05 | C(2, 4) | −8.6063E−12 | C(2, 6) | −3.6526E−16 | C(6, 4) | 2.01763E−20 |
| | C(4, 0) | −4.8064E−08 | C(0, 6) | −1.1125E−12 | C(0, 8) | 1.46399E−15 | C(4, 6) | −1.2016E−20 |
| | C(2, 2) | 5.24071E−08 | C(6, 1) | 6.24714E−14 | C(8, 1) | −2.1563E−18 | C(2, 8) | 3.21408E−21 |
| | C(0, 4) | 9.53861E−08 | C(4, 3) | −3.4381E−14 | C(6, 3) | 2.86073E−18 | C(0, 10) | −1.4922E−19 |

TABLE 4

| Surface | ADE (°) | YDE (mm) |
|---|---|---|
| S0 | −1.163 | 0.0 |
| S23 | 29.000 | 0.0 |
| S24 | −43.000 | 0.0 |
| S25 | 30.000 | 0.0 |

Figure 5:
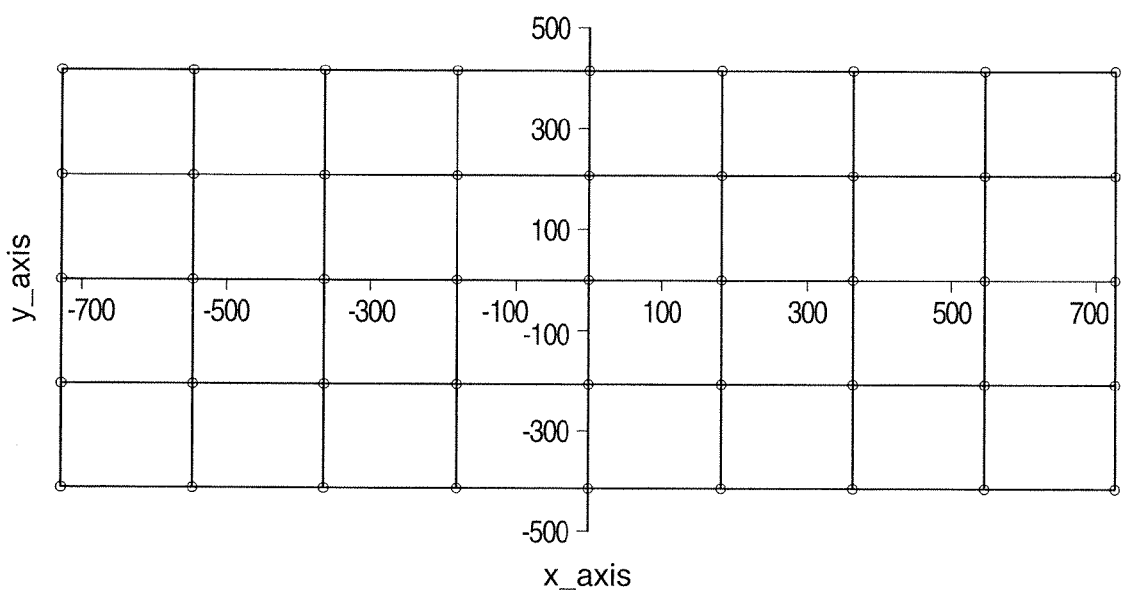
FIG. 5 is a view showing a distortion characteristic of the embodiment of the invention.

Numerical values in the above tables 1-4 are for a case in which an image of a size 16×9 on the object plane is projected to have a size 1452.8×817.2 on the screen. The distortion of the image at this case is shown in FIG. 5. A longitudinal direction of FIG. 5 is a vertical direction of FIG. 3, that is, the direction of Y axis. A transverse direction of FIG. 5 is a direction perpendicular to the Y axis on the screen, and a center of the rectangular shape in the drawing is the center of the image. A bent condition of a straight line on the image plane divided longitudinally to four parts and divided transversely to eight parts is shown in the drawing so that the distortion of the image is shown.

Figure 6:
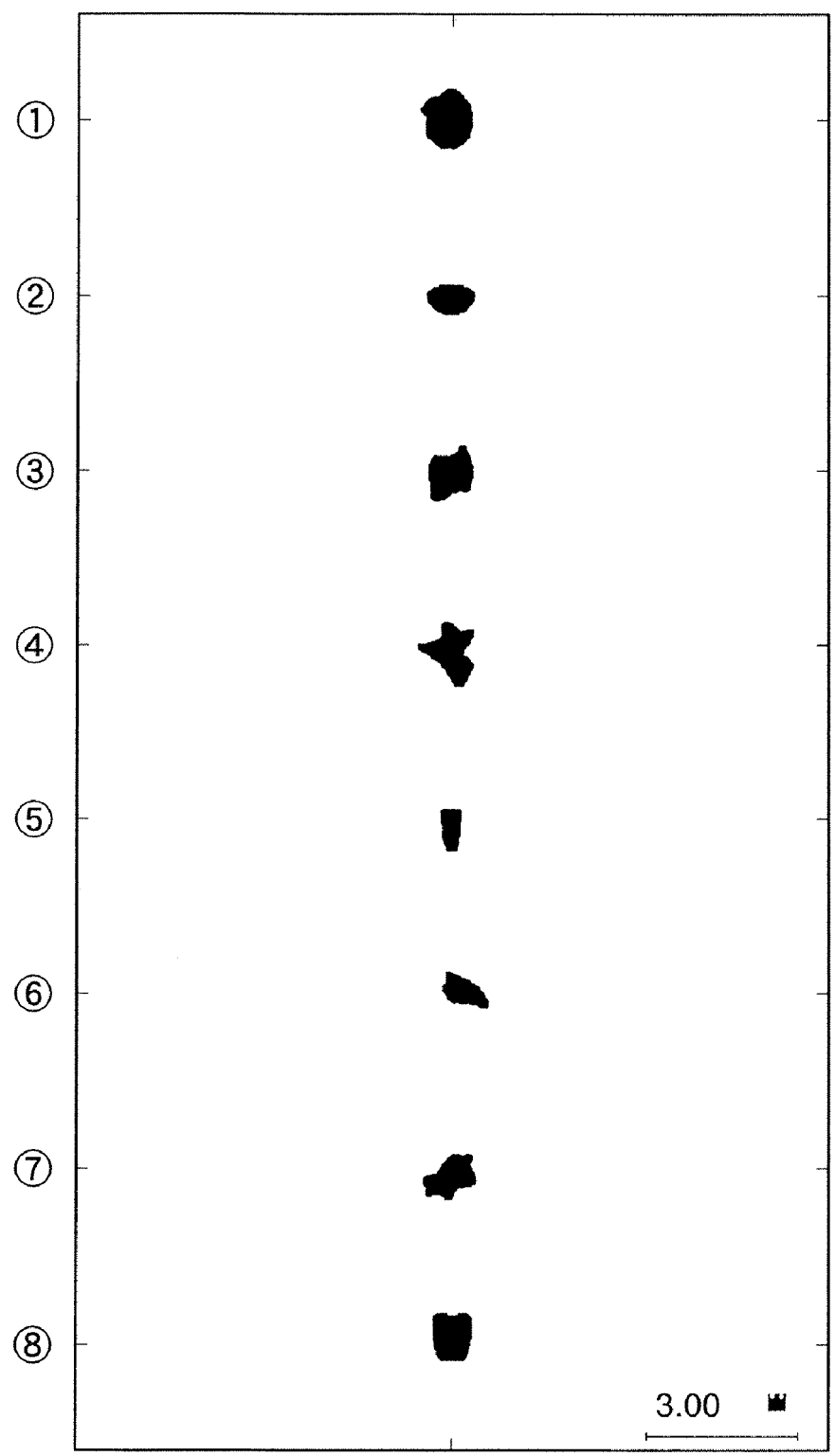
FIG. 6 is a view showing a spot performance of the embodiment of the invention.

Spot diagrams of the embodiment with the numerical values are shown in FIG. 6. In FIG. 6, spot diagrams of luminous fluxes emitted respectively from eight points (8, 4.5), (0, 4.5), (4.8, 2.7), (8, 0), (0, 0), (4.8, −2.7), (8, −4.5) and (0, −4.5) in values on X-Y coordinates on the image plane of the image display element 11 are shown in order from the top. Unit is mm. A transverse direction of each of the spot diagrams is the X direction on the screen, and the longitudinal direction thereof is Y direction on the screen. As stated above, both have good performances.

The optical unit of the embodiment of the invention is explained above. The embodiment is differentiated from the patent document 1 as the prior art by that the rear group 13 of the projecting lens 2 is formed by the free-form curved surface lens, and the second optical system is formed by the free-form curved surface reflection surface asymmetrical rotationally. Further, roles of these are independent of each other, so that the second optical system corrects mainly the trapezoidal distortion, and the rear group 13 of the projecting lens 2 as the first optical system corrects mainly the asymmetrical aberration such as the distortion of the image plane.

Therefore, in the embodiment, the adjustment for focusing during the assembling cannot be brought about by moving a lens group of an image forming optical system along its axis as the prior art.

Figure 7:
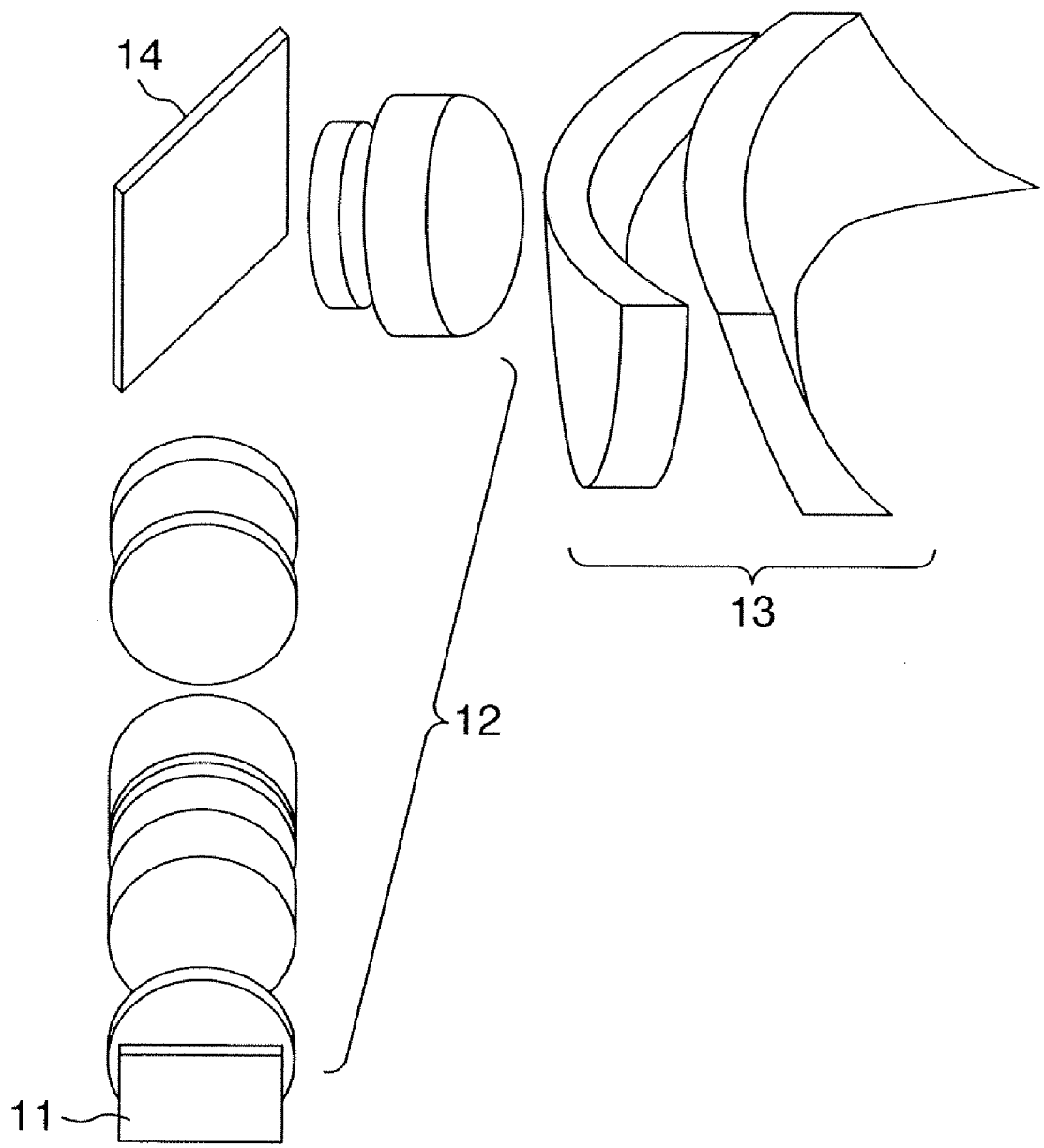
FIG. 7 is a view showing an embodiment of a projecting optical unit of the invention.

FIG. 7 shows the lens group of the projecting lens 2 as the projecting optical unit of the embodiment, while a lens holder for holding the lens group is not shown in the drawing. The front group 12 of the projecting lens 2 is the main lens for projecting onto the screen (not shown) the displayed image on the image display element 11, and is composed by the plurality of the dioptric lenses having the rotationally symmetrical surfaces so that the basis aberration in the rotationally symmetrical optical system is corrected. The rear group 13 of the projecting lens 2 includes the free-form curved surface lens rotationally asymmetrical to mainly correct the aberration caused by the oblique projection.

As apparent from FIG. 7, in the embodiment, at least one of the free-form curved surface lenses is curved to be concave in the light emitting direction. Further, the curvature of the part (the lower side of the free-form curved surface lens) of the free-form curved surface lens through which the light beam toward the lower end of the screen 3 passes is made greater than the curvature of the part (the upper side of the free-form curved surface lens) of the free-form curved surface lens through which the light beam toward the upper end of the screen 3 passes. Further, in the embodiment, the rear group 13 of the projecting lens 2 is a pair of the free-form curved surface lenses.

In the embodiment, the turning mirror 14 is arranged in the intermediate position of the front group 12. In the prior art, for moving axially the lens group of the image forming optical system, the lens holder (lens tube) has an oblique groove along which the inner lens group is rotated. In the embodiment, since the rotationally asymmetrical free-form curved surface lens is used, the rear group 13 including the rotationally asymmetrical free-form curved surface lens should not be rotated. Therefore, in the embodiment, the lens group cannot be moved along the optical axis as the above mentioned prior art. On the other hand, since the front group 12 of the projecting lens 2 of the embodiment is formed by the rotationally symmetrical lens group, the optical image is not deformed by the rotation of the front group 12. Therefore, the focusing can be performed by moving axially the front group 12. However, by this focusing, the position of the light beam reaching the incident face of the rear group 13 for correcting the aberration changes. By the change of the position of the light beam, there is a provability of that the rear group 13 cannot correct sufficiently the aberration. Therefore, in the embodiment, a positional relationship between the front and rear groups 12 and 13 of the projecting lens 2 is fixed, and the position and/or inclination of the image display element 11 beyond the projecting lens is changed for the focusing during the assembling and adjusting.

Figure 8:
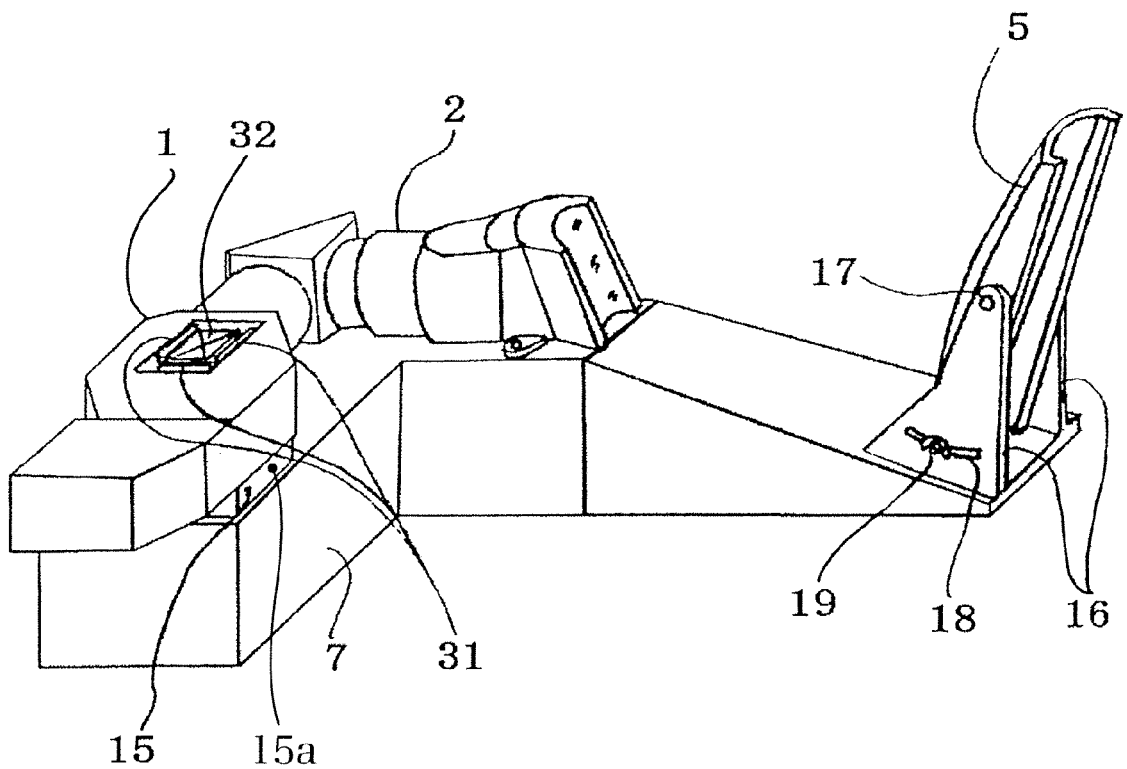
FIG. 8 is a view showing an adjusting mechanism of the projecting optical unit of the invention.

FIG. 8 shows an embodiment of the optical unit having such adjusting mechanism. In FIG. 8, the image generator 1 has, for example, a transmission type liquid crystal panel of three-plates type, or the reflection type crystal panel. Further, it may have a display element having the micro-mirrors. The projecting lens 2 has the turn mirror 14 as shown in FIG. 7 at the intermediate position of the front group 12. The free-form curved surface mirror 5 is connected to the optical system base 7 integrally together with the image generator 1 and the projecting lens 2. The projecting lens 2 as one of the members connected to the optical system base 7 is rigidly fixed and united. On the other hand, the image generator 1 is connected to the optical system base 7 in such a manner that at least its inclination (on a pivotal axis parallel to the X axis) with respect to a vertical line and its distance in a forward and backward direction (Z axis direction), that is, a distance between an outgoing side of the image generator 1 and the front group 12 can be adjusted by an adjusting mechanism 15 as the claimed common optical system support unit. (That is, the adjusting mechanism 15 has at least one of a rotary support (for example, rotary bearing) for adjusting the inclination of the image display plane of the image generator 1 with respect to the optical axis of the projecting lens 2 and an axial support (for example, a splined linear bearing unit) for adjusting a distance along the optical axis of the projecting lens 2 between the image display plane of the image generator 1 and the projecting lens 2 or the optical system base 7 to which the projecting lens 2 including the rotationally symmetrical lens and rotationally asymmetrical lens fixed to each other in rotational and axial positional relationship therebetween is fixed in rotational and axial positional relationship between the projecting lens 2 and the optical system base 7 while keeping the rotational positional relationship between the image display plane of the image generator 1 and the projecting lens 2 or the optical system base 7 unchanged and/or keeping the rotational and axial (along the optical axis of the projecting lens 2) positional relationship between the rotationally symmetrical lens and rotationally asymmetrical lens unchanged, and a fixing member 15a (for example, a screw pressing the image generator 1 against the optical system base 7 to be kept stationary with respect to each other or an adhesive adhering to the image generator 1 and optical system base 7 to be kept stationary with respect to each other) for fixing the inclination of the image display plane of the image generator 1 with respect to the optical axis of the projecting lens 2 and/or the distance along the optical axis of the projecting lens 2 between the image display plane of the image generator 1 and the projecting lens 2 or the optical system base 7 after the inclination of the image display plane of the image generator 1 with respect to the optical axis of the projecting lens 2 and/or the distance along the optical axis of the projecting lens 2 between the image display plane of the image generator 1 and the projecting lens 2 or the optical system base 7 is adjusted. When adjusting the distance along the optical axis of the projecting lens 2 between the image display plane of the image generator 1 and the projecting lens 2 or the optical system base 7, the adjusting mechanism 15 prevents the relative rotational and/or axial movement between the rotationally symmetrical lens and rotationally asymmetrical lens of the projecting lens 2 so that the rotational and/or axial positional relationship between the rotationally symmetrical lens and rotationally asymmetrical lens of the projecting lens 2 is prevented from being changed by adjusting the distance along the optical axis of the projecting lens 2 between the image display plane of the image generator 1 and the projecting lens 2 or the optical system base 7, and prevents the relative rotational movement between the image display plane of the image generator 1 and the projecting lens 2 or the optical system base 7 so that the rotational positional relationship between the image display plane of the image generator 1 and the projecting lens 2 including the rotationally symmetrical lens and rotationally asymmetrical lens or the optical system base 7 is prevented from being changed by adjusting the distance along the optical axis of the projecting lens 2 between the image display plane of the image generator 1 and the projecting lens 2 or the optical system base 7.) The free-form curved surface mirror 5 is connected through a supporter 16 to the optical system base 7 in such a manner that the free-form curved surface mirror 5 is rotatable on an axis (pin 17) passing a substantially center of the free-form curved surface mirror 5 and fixed to the optical system base 7, and is capable of being rotationally fixed by the supporter 16 to the optical system base 7 after being adjusted in rotational position of the free-form curved surface mirror 5 on the axis with respect to the optical system base 7. When adjusting the distance along the optical axis of the projecting lens 2 between the image display plane of the image generator 1 and the projecting lens 2 or the optical system base 7, the relationship in position and/or attitude (for example, rotational position) between the optical system base 7 or the projecting lens 2 and the free-form curved surface mirror 5 or the axis passing the substantially center of the free-form curved surface mirror 5 and fixed to the optical system base 7 is prevented from being changed by adjusting the distance along the optical axis of the projecting lens 2 between the image display plane of the image generator 1 and the projecting lens 2 or the optical system base 7. In FIG. 8, a pin 17 as the rotational axis supports the center of the free-form curved surface mirror 5 at both ends thereof so that the free-form curved surface mirror 5 is supported thereon in a rotatable manner. A lower end of the free-form curved surface mirror 5 is connected to a butterfly fixing nut 19 through a rotary guide groove 18. By the butterfly fixing nut 19, the lower end of the free-form curved surface mirror 5 slides along the rotary guide groove 18 so that the free-form curved surface mirror 5 is rotatable on the pin 17. Accordingly, an angle between a normal line at the center of the reflecting surface of the free-form curved surface mirror 5 and the optical axis of the projecting lens 2, that is, an inclination angle of the free-form curved surface mirror 5 is adjusted.

In the embodiment, for the image generator 1, three transmission type liquid crystal panels 31 corresponding to red, green and blue are used. The images from these liquid crystal panels are combined by a cross-dichroic prism 32.

The images of red, green and blue can be focused by moving the liquid crystal panels 31 independent of each other. However, in such case, physical values to be compensated for positioning the projected image, positioning pixels, correcting the aberration on the image plane and so forth are numerous. Therefore, it is difficult for all of the adjustments to be brought about by only moving each of the liquid crystal panels 31. Accordingly, in the embodiment, the movement of each of the liquid crystal panels 31 is used for positioning the pixels, the adjusting mechanism 15 for supporting the image generator 1 is used for positioning the projected image and correcting the aberration on the image plane to be separated from adjusting each of the liquid crystal panels 31. Further, a distortive aberration is corrected by the rotation of the free-form curved surface mirror 5. In the embodiment, a correcting mechanism is divided in accordance with the physical values to be corrected so that the focusing of the image can be easily done.

The division of the correcting mechanism as mentioned above can be done by the following reason. That is, in the embodiment, (1) the front group 12 of the projecting lens 2 is used as the main lens for projecting onto the screen 3 the displayed images on the liquid crystal panels 31 while the front group 12 corrects the basic aberration in the rotationally symmetrical optical system, (2) the rear group 13 of the projecting lens 2 is the free-form curved surface lens rotationally asymmetrical to correct mainly the aberration on the image plane, and (3) the free-form curved surface mirror 5 corrects mainly the distortive aberration, so that the above mentioned correcting mechanism is obtained.

Figure 9:
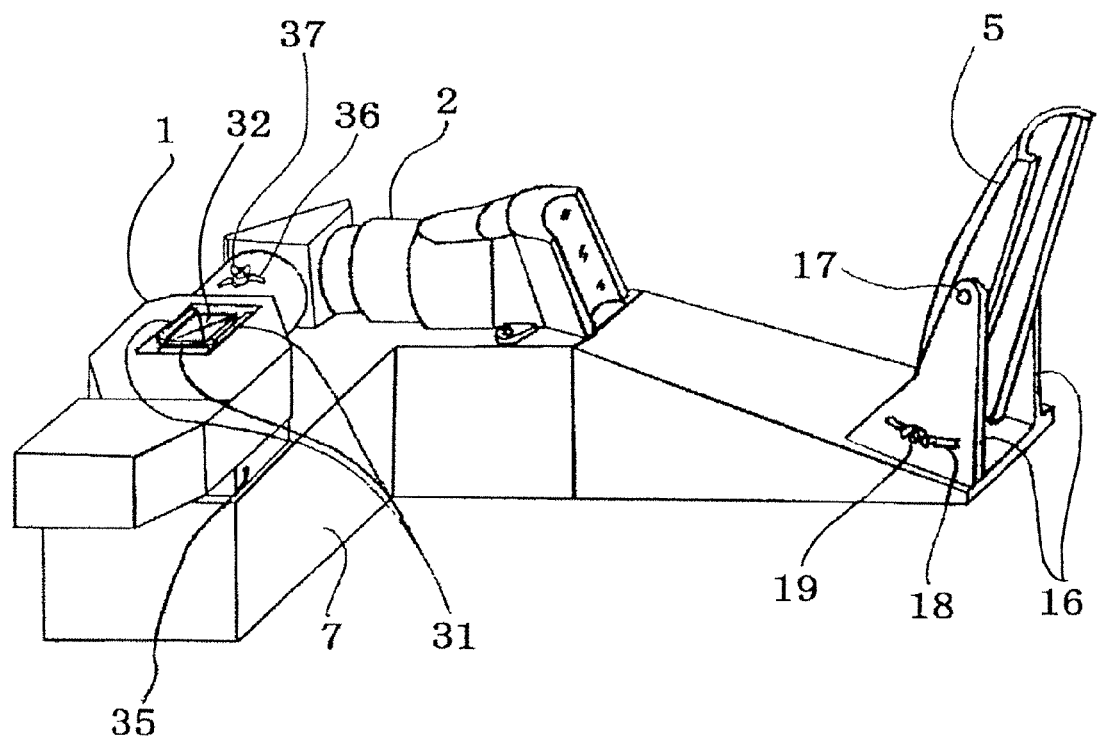
FIG. 9 is a view showing another adjusting mechanism of the projecting optical unit of the invention.

Another embodiment of the projecting optical unit of the invention is shown in FIG. 9. A difference thereof from FIG. 8 is that the lens group of the maximum positive power (not shown, and hereafter called as a power lens) in the front group of the projecting lens 2 is movable axially. For moving the power lens axially, the lens holder (lens tube) has an oblique guide groove 36 for guiding the lens so that the inner lens group is rotated along the groove. In FIG. 9, a lens fixing butterfly nut 37 is connected to the power lens or a holder thereof and is moved along the guide groove 36 to move the power lens along its axis. That is, in the embodiment, the mechanism for focusing is formed by the guide groove 36 and lens fixing butterfly nut 37. If the projecting lens 2 has this additional function, the adjusting mechanism 35 fixed to the optical system base 7 in such a manner that the image generator 1 is adjustable may be eliminated. Further, by the adjusting mechanism of the power lens as shown in FIG. 8, at least the adjustment of the distance in the forward and backward direction (Z axis direction) may be eliminated.

As mentioned above, in the embodiments, the rear projection type color image display device is realized, by which the depth size of the set is decreased and the assembly and adjustment can be easily done. Further, a unit in which the planar reflection surface mirror as included by the above optical system is eliminated and which includes from the image display element to the free-form curved surface mirror is a front projection display. Therefore, the compact front projection display device with the extremely decreased distance from the device to the screen is obtainable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical projection unit for projecting an image onto a screen, comprising:
   an image source including three image display elements for forming respective image elements, and a cross-dichroic prism for combining the image elements into the image;
   a projection lens unit including a plurality of lenses to enlarge the image formed by the image source, at least one of the lenses having a shape rotationally asymmetrical with respect to an optical axis of the projection lens unit, the optical axis of the projection lens unit at the locations where it intersects the display elements being oblique with respect to normal lines of the image display elements;
   a reflection mirror for enlarging the image and emitting the image in a reflecting direction so that the image reaches the screen with a predetermined angle with respect to a normal line of the screen, a reflection surface of the reflection mirror having a shape rotationally asymmetrical with respect to an optical axis of the reflection mirror; and
   a support unit for adjusting the reflecting direction of the mirror with respect to the optical axis of the projection lens unit.

2. The optical projection unit according to claim 1, wherein the image source is movable to adjust an angle of its normal line with respect to the reflecting direction and to adjust an optical path length between the image source and the projection lens unit.

3. The optical projection unit according to claim 1, wherein each of the image display elements is movable to adjust an inclination angle of its normal line and to adjust an optical path length between each of the image display elements and the projection lens unit.

* * * * *